United States Patent [19]

Webster et al.

[11] Patent Number: 5,071,197
[45] Date of Patent: Dec. 10, 1991

[54] WHEEL COVER RETENTION

[75] Inventors: Joseph J. Webster, Fenton; Leonid Drits, W. Bloomfield, both of Mich.

[73] Assignee: General Motors Corporation, Detroit, Mich.

[21] Appl. No.: 624,942

[22] Filed: Dec. 10, 1990

[51] Int. Cl.⁵ .................................................. B60B 7/12
[52] U.S. Cl. ................................. 301/37 S; 301/37 P; 301/108 S
[58] Field of Search .............. 301/37 R, 37 S, 37 P, 301/108 R, 108 S, 108 A, 9 DN

[56] References Cited

U.S. PATENT DOCUMENTS

| | | | |
|---|---|---|---|
| 4,382,635 | 5/1983 | Brown et al. | 301/37 S X |
| 4,408,803 | 10/1983 | Green et al. | 301/37 R X |
| 4,962,968 | 10/1990 | Caplin | 301/37 S X |
| 4,998,780 | 3/1991 | Eshler et al. | 301/37 S |

FOREIGN PATENT DOCUMENTS

| | | | |
|---|---|---|---|
| 0527998 | 6/1931 | Fed. Rep. of Germany | 301/9 DN |
| 2607447 | 6/1988 | France | 301/37 S |

Primary Examiner—Russell D. Stormer
Attorney, Agent, or Firm—Herbert Furman

[57] ABSTRACT

A wheel cover retention includes a wheel cover having a cover body and a plurality of annular extensions having an internal spiral thread extending for a predetermined axial distance and subdivided into a plurality of radially flexible fingers by transverse slots. The extensions cooperate with externally spiral threaded lug nuts to retain the cover to the wheel. The fingers of the extensions ratchet past the threads of the lug nuts as the cover is assembled to and disassembled from the wheel. The extensions include stops limiting the penetration of the lug nuts within the extensions so that the threads of other lug nuts do not split or jam within the unthreaded portions of the extensions.

6 Claims, 1 Drawing Sheet

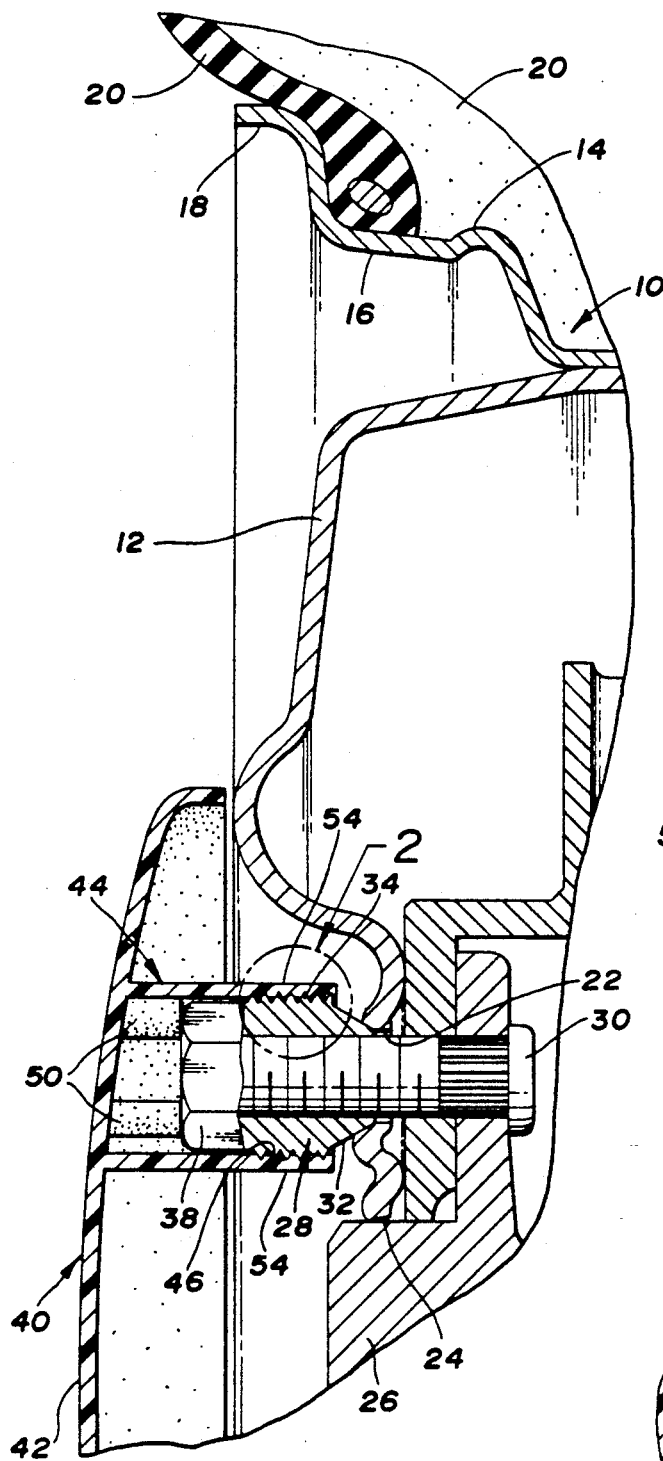
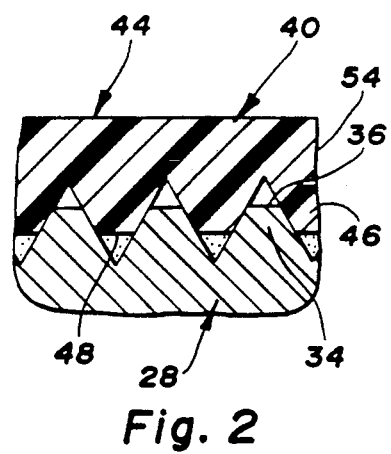
Fig. 2
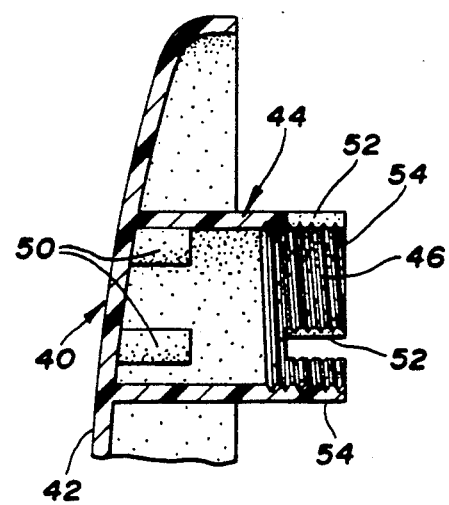
Fig. 3
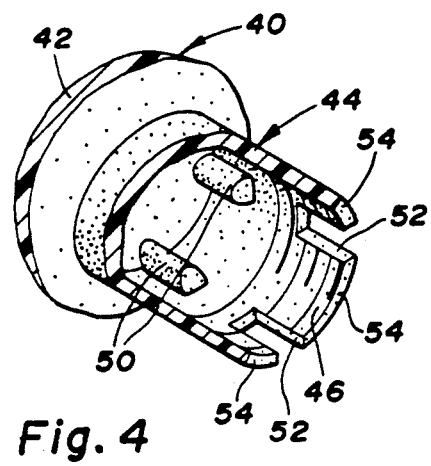
Fig. 4
Fig. 1

WHEEL COVER RETENTION

BACKGROUND OF THE INVENTION

This invention relates to the retention of plastic wheel covers on vehicle wheels and more particularly to the retention of plastic wheel covers on the lug nuts of vehicle wheels.

It is known to retain vehicle wheels on vehicles by lug nuts, either locking or non-locking, which thread to the lugs of the vehicle. U.S. Pat. No. 4,382,635 Brown et al, Plastic Vehicle Wheel Cover and U.S. Pat. No. 4,707,035 Kondo et al, Synthetic Resin Vehicle Wheel Cover show the retention of plastic wheel covers on vehicle wheels by the engagement of the ribbed ends of slotted or unslotted tubular extensions of the cover engaging annular grooves of the lug nuts. It is also known to provide a plastic wheel cover with flanged openings which receive externally threaded lug nuts and to retain the cover to the wheel by flanged plastic caps which thread to the lug nuts and engage the flanges of the cover openings. U.S. Pat. Ser. No. 415,751 Eshler et al, filed Oct. 2, 1989, Wheel Trim Retention, now U.S. Pat. No. 4,998,780, and assigned to the assignee of this invention discloses such a retention having the additional feature of retaining the plastic caps to the wheel cover so as to avoid loss.

The wheel cover retention of this invention is integral with the cover and includes a number of integral non-rotatable tubular extensions having internally spirally threaded axially outer portions which are slotted to provide a plurality of radially flexible internally threaded fingers. The fingers flex as the extensions are axially force fitted over externally threaded lug nuts. The thread to thread engagement of the fingers and the lug nuts securely retain the wheel cover to the wheel. The extent of axial engagement of the extensions with their respective lug nuts can vary so that the attitude of the wheel cover relative to the wheel opening can be adjusted. Thus, if the lug nuts are not all in the same radial plane, the cover can be adjusted to compensate for this and be located in the desired attitude relative to the wheel. Each cover extension further includes integral stops adjacent the axial termination of its internal spiral thread to limit the extent of engagement of the fingers with a respective lug nut and prevent jamming of the spiral thread of the lug nut within the unthreaded axially outer portion of the extension. The spiral threads of the lug nuts and of the extensions are truncated to lessen the force required to assemble and disassemble the extensions and the lug nuts.

The primary feature of this invention is that it provides an integral wheel cover retention which includes a plurality of integral annular extensions having radially flexible fingers which are internally spiral threaded and which radially flex as the wheel cover is forcibly assembled to and disassembled from externally spiral threaded lug nuts of the wheel. Another feature is that the extensions are partially slotted to provide the radially flexible fingers. A further feature is that the extensions are partially internally threaded and include limit stops to prevent jamming of the lug nuts in the unthreaded portions of the extensions. Yet another feature is that the retention permits the wheel cover to be adjusted relative to the plane of the wheel to compensate for misalignment of the lug nuts radially of the wheel. Yet a further feature is that the threads of the extensions and of the lug nuts are truncated to lessen the force required to assemble and disassemble the cover and the wheel.

These and other features of the invention will be readily apparent from the following specification and drawing wherein:

FIG. 1 is a partial sectional view of a vehicle wheel having a wheel cover mounted thereon by a wheel cover retention according to this invention.

FIG. 2 is an enlarged view of the circled portion of FIG. 1.

FIG. 3 is a view of a portion of the wheel cover disassembled from the wheel; and FIG. 4 is a broken away perspective view of a portion of the wheel cover.

Referring now to FIG. 1 of the drawing, a conventional vehicle wheel designated generally 10 includes a center disk portion 12 and an outer rim portion 14 having a tire bead flange 16 and a terminal flange 18. A conventional tire 20 has it sidewalls seated on flange 16 and a corresponding flange not shown, of the rim portion 14.

The disk portion 12 of the wheel 10 includes a number of openings 22 arranged radially around a center or pilot opening 24 thereof. The pilot opening 24 receives a center portion 26 of the vehicle axle. A lug nut 28 is threaded on each of the lugs 30 of the vehicle axle to mount the wheel 10 thereon. Each lug nut includes a tapered axially inner end 32 which engages a like edge of a respective opening 22 when the lug nut is threaded on a respective lug 30.

Each lug nut 28 further includes an external spiral thread 34 which is truncated at 36, as shown in FIG. 2, and a hex shaped head 38.

A wheel cover 40 of plastic material covers the opening of the disk portion 12. If desired, the wheel cover 40 could cover the opening of the wheel 10, as defined by the terminal flange 18. The cover 40 includes a cover face or body portion 42 and a series of integral tubular extensions 44, each respective to one of the lug nuts 28. Each extension 44 is provided with an internal spiral thread 46 along its axially inner portion, with the thread 46 having the same pitch and axial extent as the external spiral thread 34 of a respective lug nut. As shown in FIG. 2, the thread 46 is truncated at 48. The axially outer portion of each extension is unthreaded and has an internal diameter slightly greater than the greatest external diameter of the hex shaped head 38 of the lug nut received therein, as will be described. This portion of the extension is further provided with a series of internal axial ribs 50 for a purpose to be described.

The axially inner internally threaded portion of each extension is axially slotted at 52 at three equally spaced circumferential locations to provide each extension with a like number of internally threaded radially flexible fingers 54.

The wheel cover 40 is assembled to the vehicle wheel 10 by aligning the axially inner ends of the extensions 44 with the lug nuts 28 and then forcibly moving the cover axially inwardly of the wheel. As the cover is moved axially inwardly of the wheel, the fingers 54 of each of the extensions flex radially as the truncated spiral thread 46 thereof slides over and ratchets past the truncated spiral thread 34 of a respective lug nut. As can be seen in FIG. 1, there is a substantial axial extent of engagement between the thread 46 of the fingers 54 and the thread 34 of a respective lug nut to provide a secure retention of the wheel cover to the wheel.

The cover can be pushed axially inwardly of the wheel until the hex heads 38 of the extensions engage the ribs 50 which act as limit stops to prevent the external spiral threads 34 of the lug nuts from jamming into the unthreaded axially outer portions of the extensions and increasing the risk of splitting of the extensions and also increasing the force necessary to disassemble the cover from the wheel.

Once the cover 40 is assembled to the wheel 10, it can be adjusted axially relative to the wheel so that the outer face or body 42 of the cover lies in a plane parallel to the radial plane of the wheel and there is no visible wobble of the cover and wheel as the wheel rotates. The adjustment is easily accomplished by axially shifting the cover relative to the wheel as one or more extensions move axially outwardly relative to their respective lug nuts and the other extensions move axially inwardly relative to their respective lug nuts. Radial plane misalignment of the cover and wheel can occur should one or more of the lug nuts 28 be radially misaligned so that their hex heads 38 will not all lie in the same radial plane. This will radially misalign the cover and wheel when the ribs 50 of the extensions engages the hex heads of the lug nuts. The axial adjustment of the cover relative to the wheel is an important advantage of the retention of this invention over prior art retentions wherein extensions of the cover engage annular grooves of lug nuts and no adjustment is possible.

The cover can be disassembled from the wheel by pulling on the body 42 of the cover so that the spiral threads of the radially flexible fingers 54 of the extensions ratchet past the external spiral threads 34 of the lug nuts. The truncated threads 34 and 46 increase the ease of assembly and disassembly of the cover and wheel.

Thus this invention provides a retention of a plastic wheel cover on the lug nuts of a vehicle wheel.

The embodiments of the invention in which an exclusive property or privilege is claimed are defined as follows:

1. In combination with a vehicle wheel attached to the vehicle by a plurality of lug nuts, each having an external spiral thread extending axially thereof for a predetermined axial distance, a wheel cover retention comprising, a wheel cover having a cover body, for covering the lug nuts of the wheel and a plurality of annular extensions formed with the cover body and extending axially from the cover body for attaching the wheel cover to the lug nuts of the wheel, each annular extension including an internal spiral thread extending axially internally thereof from the axially inner end thereof for a predetermined distance generally equal to that of a respective lug nut and having a pitch generally matching that of the lug nut spiral thread, each extension also including a plurality of axial slots extending transversely through the internal spiral thread thereof and subdividing the extension into a plurality of radially flexible internally spiral threaded fingers axially forcibly engageable with and disengageable from the external spiral thread of a respective lug nut, each extension further including stop means adjacent the axially outer termination of the internal axial thread thereof, the cover being axially forcibly assembled to and disassembled from the lug nuts as the radially flexible fingers of the extensions flex radially inwardly and outwardly as the internal spiral threads thereof ratchet past the spiral threads of respective lug nuts, the cover being axially adjustable relative to the wheel by axial adjustment of the extensions relative to the lug nuts to avoid cover wobble as the wheel rotates, the stop means of the extensions limiting the extent of axial penetration of the lug nuts within the extensions to prevent jamming of the lug nut spiral threads within the unthreaded portions of the extensions.

2. The combination recited in claim 1 wherein the spiral threads of the lug nuts and extension are truncated to lessen the force required to assemble and disassemble the cover and wheel.

3. The combination recited in claim 1 wherein the stop means is provided by a series of axially extending ribs on the internal surface of each extension.

4. The combination recited in claim 1 wherein the extensions are tubular and are integral with the cover body, the spiral thread being provided on the axially inner, ends of the extensions and the stop means being provided in the axially outer unthreaded portions of the extensions.

5. The combination recited in claim 1 wherein the extensions are cylindrical and extend axially a predetermined distance from the cover body to axially space the cover body relative to the vehicle wheel.

6. The combination recited in claim 4 wherein the stop means are integral with the extensions and are comprised of a plurality of internal axially extending ribs.

* * * * *